April 9, 1929. A. L. HOWARD 1,708,063
FINISHING STRIP OR WELT FOR UPHOLSTERY
Filed Jan. 12, 1926
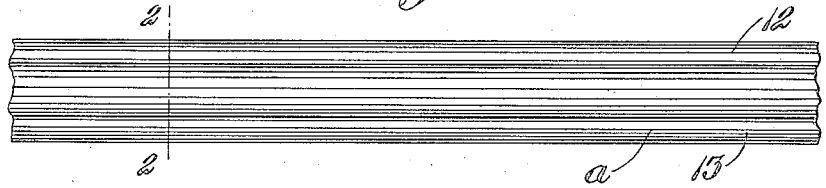
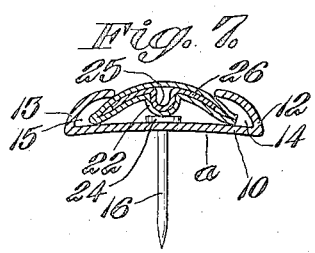
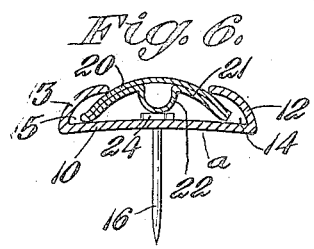
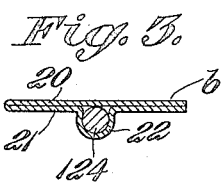
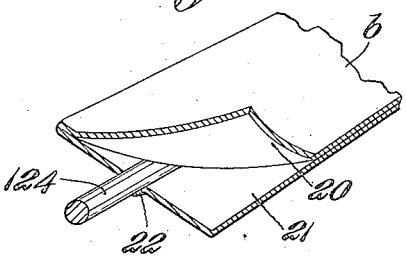
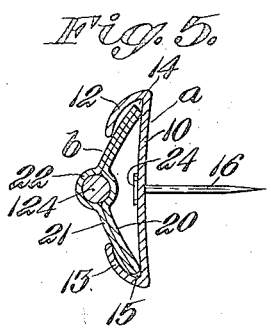
INVENTOR.
Albert L. Howard
BY Jas. H. Churchill
ATTORNEY.

Patented Apr. 9, 1929.

1,708,063

UNITED STATES PATENT OFFICE.

ALBERT L. HOWARD, OF BRAINTREE, MASSACHUSETTS, ASSIGNOR TO ASHTON HAMILTON, OF BROCKTON, MASSACHUSETTS.

FINISHING STRIP OR WELT FOR UPHOLSTERY.

Application filed January 12, 1926. Serial No. 80,837.

This invention relates to a finishing strip or welt for upholstery especially adapted for use as a filler member for a metal molding employed on automobile tops and other articles to be trimmed.

The invention has for its object to provide a simple, inexpensive and reversible finishing strip with which different designs may be obtained when applied to the metal molding.

To this end, the finishing strip or welt is made of flexible leather or like material and is provided with a layer having a longitudinally extended hollow bead substantially at the transverse center of said layer to leave side portions of substantial width on opposite sides of said bead, and with a second layer integral with the beaded layer and extended from the edge of one side portion across said hollow bead to the other side portion and cemented or otherwise secured to the first-mentioned layer on opposite sides of said hollow bead.

The hollow bead may and preferably will be provided within it with a reinforcing filler member.

The particular features of the invention will be pointed out in the claim at the end of this specification.

Fig. 1 is a front elevation of a piece of metal molding provided with a finishing strip or welt embodying this invention;

Fig. 2, a section on the line 2—2, Fig. 1;

Fig. 3, a section of the strip or welt shown in Figs. 1 and 2 removed from the metal molding;

Fig. 4, a perspectvie view illustrating the method of manufacturing the strip or welt shown in Fig. 3;

Fig. 5, a view like Fig. 2 with the finishing strip or welt reversed, and

Figs. 6 and 7, sectional views of modifications to be referred to.

Referring to the drawing, and especially Figs. 1 to 5 inclusive, a represents a sheet metal molding having a substantially flat base 10 and side flanges 12, 13 preferably curved and turned inwardly toward each other to leave a relatively wide space or opening between them. The flanges 12, 13 co-operate with the base 10 to form side channels 14, 15 and the base 10 is provided with holes (not shown) which are suitably spaced apart and through which are driven nails or fastening devices 16 for securing the metal molding to the automobile top or other article to be trimmed.

The space between the side flanges 12, 13 is closed by a finishing strip or welt b, which is preferably made as herein shown and is composed of a piece or strip of leather or like material folded longitudinally to form two plies or layers 20, 21 of unequal length, so as to provide one layer as 21 with a sufficient surplus to enable it to form a hollow bead 22, preferably substantially circular as shown, which is located substantially at the transverse center of the layer 21 to leave side portions of substantial width and is extended lengthwise thereof.

The hollow bead 22 may and preferably will be made of sufficiently large diameter to contact with the heads 24 of the nails 16 under one condition of use, as will be described.

The portions of the layer 21 on opposite sides of the hollow bead 22 are cemented or otherwise secured to the layer 20, which serves to stiffen or strengthen the finishing strip or welt sufficiently to enable it to retain the shape given to it when placed in the sheet metal molding a.

The hollow bead 22 may be left empty as shown in Fig. 6, or it may be wholly or partially filled by a filler member.

In Fig. 2, the filler member is shown as a circular cord or other device 124, which arrangement is preferred, or it may be made as a smaller hollow bead 25 forming part of a layer 26 which is interposed between the layers 20, 21, as shown in Fig. 7.

In Fig 3, the finishing strip or welt provided with the bead 22 and filler 124, is shown in what may be designated its flat condition.

The strip or welt b is capable of being quickly and easily inserted into the molding a with a layer 20 outermost as shown in Fig. 2, or with the beaded layer 21 outermost as shown in Fig. 5.

In its normal or flat condition shown in Fig. 3, the finishing strip or welt b is materially wider than the space between the flanges 12, 13 of the metal molding and of sufficient width to enable it to be arched or curved transversely so as to have its outer surface bear against the said flanges and its ends bear against the base 10 of the metal molding.

When the finishing strip or welt b is placed in the metal molding with its layer 20 outermost, the molding is provided with a finishing strip or welt of one design or appearance, namely, one having its exposed surface in the form of a continuous plain arch between the side flanges of the molding.

When however, the finishing strip or welt is reversed, and placed in the molding with the beaded layer 21 outermost, as shown in Fig. 5, the metal molding is provided with a finishing strip or welt of a different design or appearance, namely, one having an arch provided with a bead located centrally or substantially so with respect to the side flanges of the molding.

It thus becomes evident that the improved finishing strip or welt is reversible and capable of being used with the metal molding to produce two markedly different designs of finish.

It will be observed that the cost of producing the finishing strip or welt is reduced to the minimum, in the form shown in Fig. 6, wherein it consists of a single piece of leather or like material folded longitudinally to form two layers, one of which is provided with a hollow bead and with side portions of substantial width on opposite sides of said hollow bead which are capable of being flexed to insert them under the flanges 12, 13 of the molding.

In the form shown in Fig. 7, the cost is but slightly increased by the use of the reinforcing layer 26, whereas in the preferred form shown in Figs. 1, 2 and 5, the cost is increased but slightly over the non-reinforced form shown in Fig. 6 by the use of the cord 24.

It will also be observed that when the finishing strip or welt is used as shown in Fig 2, the hollow bead 22 is designed to rest on the head of the nail and form a supporting member for the arch-shaped outer surface layer 20 of the finishing strip or welt.

The construction of the finishing strip or welt is such that it can be quickly and easily applied to or removed from the metal molding, either by sliding it into the molding or by inserting one edge into one channel and then forcing the other edge into the other channel by a tool drawn longitudinally along the strip in contact with the other flange, the flexibility of the side portions on opposite sides of the hollow bead of the finishing strip or welt enabling this to be done.

From the above description, it will be seen that I have provided a finishing strip or welt which is reversible and capable of providing different designs, which can be applied to and removed from the metal molding in a minimum time and with a minimum of labor and which is inexpensive to manufacture.

What I claim is:

A finishing strip or welt comprising a relatively thin layer of leather or like material having a longitudinally extended hollow bead substantially at the transverse center of said layer to leave side portions of substantial width on opposite sides of said bead, and a second layer integral with the beaded layer and extended from the edge of one side portion across the hollow bead to the other side portion to form a continuous surface transversely of the beaded layer and substantially coextensive in width with the beaded layer and secured to the side portions of the beaded layer on opposite sides of the hollow bead thereof.

In testimony whereof, I have signed my name to this specification.

ALBERT L. HOWARD.